(12) United States Patent
Chen

(10) Patent No.: US 9,726,936 B2
(45) Date of Patent: Aug. 8, 2017

(54) LIQUID CRYSTAL DISPLAY PANEL AND METHOD FOR PREPARING THE SAME, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Yuqiong Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/513,301

(22) Filed: Oct. 14, 2014

(65) Prior Publication Data

US 2015/0370104 A1    Dec. 24, 2015

(30) Foreign Application Priority Data

Jun. 23, 2014    (CN) .......................... 2014 1 0283696

(51) Int. Cl.
*C09K 19/00*    (2006.01)
*G02F 1/1339*    (2006.01)
(Continued)

(52) U.S. Cl.
CPC .......... *G02F 1/1339* (2013.01); *G02F 1/1341* (2013.01); *G02F 1/133514* (2013.01);
(Continued)

(58) Field of Classification Search
CPC ............. G02F 1/1339; G02F 1/133509; G02F 1/133512; G02F 1/133514;
(Continued)

(56) References Cited

U.S. PATENT DOCUMENTS 6,147,721 A      11/2000  Tanaka et al.
2010/0033657 A1*  2/2010  Choi ................... G02F 1/13378
                                                          349/104

(Continued)

FOREIGN PATENT DOCUMENTS

CN    1409134 A    4/2003
CN    102608794 A    7/2012
(Continued)

OTHER PUBLICATIONS

First Office Action regarding Chinese application No. 201410283696.3, dated Mar. 28, 2016. Translation provided by Dragon Intellectual Property Law Firm.
Second Chinese Office Action regarding Application No. 2014102836963 dated Jul. 28, 2016. Translation provided by Dragon Intellectual Property Law Firm.

*Primary Examiner* — Ruiyun Zhang
(74) *Attorney, Agent, or Firm* — Harness, Dickey & Pierce, P.L.C.

(57) ABSTRACT

The invention relates to a liquid crystal display panel and a method for preparing the same, and a display device. The liquid crystal display panel comprises: a color filter substrate, and a black matrix, an RGB blocking layer, a planarization layer and that are formed in turn on the color filter substrate, and a TFT substrate, wherein, an ultraviolet absorbent is added to a raw material gel of the planarization layer and/or an RGB blocking material, and when the ultraviolet absorbent is added to the raw material gel of the planarization layer, the area of the planarization layer is no larger than that of a region sealed by the seal agent. Abnormal color development on the effective display region may be effectively avoided without employing a UV mask required in the display device of the present invention.

17 Claims, 3 Drawing Sheets

(51) Int. Cl.
  *G02F 1/1335* (2006.01)
  *G02F 1/1341* (2006.01)
  *G02F 1/1333* (2006.01)
  *G02B 5/20* (2006.01)

(52) U.S. Cl.
  CPC .... *G02B 5/20* (2013.01); *G02F 2001/133357* (2013.01); *G02F 2201/086* (2013.01); *Y10T 428/1036* (2015.01); *Y10T 428/1059* (2015.01)

(58) Field of Classification Search
  CPC ........ G02F 2001/133357; G02F 2001/133519; G02F 2201/086; Y10T 428/10; Y10T 428/1036; Y10T 428/1059; G02B 5/20; G02B 5/201
  USPC ........... 428/1.1, 1.3, 1.5; 349/104, 106, 110, 349/122; 445/25; 430/7, 14, 27, 30, 38, 430/279.1
  See application file for complete search history.

(56) References Cited

U.S. PATENT DOCUMENTS

| | | |
|---|---|---|
| 2012/0224131 A1 | 9/2012 | Kunimatsu et al. |
| 2012/0287370 A1* | 11/2012 | Chen ................. G02F 1/133371 349/58 |
| 2013/0129941 A1* | 5/2013 | Zhao ........................ G02B 5/20 428/1.3 |
| 2014/0204320 A1* | 7/2014 | Yang ................. G02F 1/133514 349/106 |

FOREIGN PATENT DOCUMENTS

| | | | |
|---|---|---|---|
| CN | 103018968 A | | 4/2013 |
| CN | 103091894 A | | 5/2013 |
| JP | H0277014 A | | 3/1990 |
| JP | 2012181505 A | * | 9/2012 |

\* cited by examiner

LIQUID CRYSTAL DISPLAY PANEL AND METHOD FOR PREPARING THE SAME, AND DISPLAY DEVICE

CROSS REFERENCE OF THE RELATED APPLICATION

The present application claims priority to the Chinese application No. 201410283696.3 filed on Jun. 23, 2014, entitled with "Liquid Crystal Display Panel and Method for Preparing the Same, and Display Device", the entire contents of which are incorporated herein by reference.

FIELD OF THE INVENTION

The present invention relates to the field of liquid crystal display technologies, and in particular, to a liquid crystal display panel and a method for preparing the same, and a display device.

DESCRIPTION OF THE PRIOR ART

At present, a process for forming a liquid crystal cell specifically includes the following steps: coating a seal agent around one glass substrate by a seal agent coating device; meanwhile, adding a liquid crystal dropwise at the center of another glass substrate via one-drop filling method; then, laminating the two glass substrates in vacuum, that is, performing a process of oppositely arranging to form a cell; and finally, curing the seal agent, thereby accomplishing the cell forming process. The curing the seal agent includes irradiating via an ultraviolet light in a short time to partially cure the seal agent; placing it into a UV curing chamber to further curing the photosensitive component in the seal agent; and finally, completely curing the uncured seal agent in a high-temperature furnace.

During UV curing, a color filter substrate 1 (a planarization layer 3' is formed on the color filter substrate 1 and has a dimension consistent with the color filter substrate 1) and a TFT substrate 4 are oppositely arranged to form a cell, and a seal agent 2 is cured via ultraviolet irradiation, as shown in FIG. 1. In order to prevent that the liquid crystal in the liquid crystal panel is affected by the ultraviolet light 6, an ultraviolet mask 5 is required, wherein the cost of the mask is very high.

As directed to the above technical problem, several solutions are put forward, for example, CN103018968A discloses a technical solution in which an opaque film is formed on the ultraviolet light incident side of a liquid crystal panel to replace the existing ultraviolet light mask, wherein the opaque film may be on the side of an array substrate or a color filter substrate. However, in the above technical solution, the opaque film, which is not a part of the substrate, needs to be peeled off, this adds the process complexity. At the same time, the cost of a transparent film is large, thus it is unfavorable for popularization and application.

Therefore, it is required to put forward an ideal liquid crystal display panel to solve the above technical defects.

SUMMARY OF THE INVENTION

It is an object of the invention provide a liquid crystal display panel where no ultraviolet mask needs to be used during curing of a seal agent, thus the cost for manufacturing the mask may be saved, the manufacturing of an ultraviolet mask may be omitted, thereby the process may be simplified, and the cost may be effectively lowered.

To attain the above objects, the invention employs the following technical solutions.

According to an aspect of the invention, the invention provides a liquid crystal display panel, which includes a color filter substrate; a black matrix, an RGB blocking layer, and a planarization layer that are formed in turn on the color filter substrate; and a TFT substrate, after the color filter substrate and the TFT substrate are oppositely arranged to form a cell, a seal agent between the color filter substrate and the TFT substrate are cured via ultraviolet, wherein an ultraviolet absorbent is added to a raw material gel of the planarization layer and/or a blocking material of the RGB blocking layer, and when the ultraviolet absorbent is added to the raw material gel of the planarization layer, the area of the planarization layer will be no larger than that of a region sealed by the seal agent.

In the invention, an ultraviolet absorbent is added to the raw gel of a planarization layer and/or a blocking material of an RGB blocking layer. Since the planarization layer and the RGB blocking layer can both cover the display region of a liquid crystal panel, when UV curing is performed on the seal agent via an ultraviolet light, the ultraviolet light irradiated on the display region may be absorbed by the ultraviolet absorbent in the planarization layer and/or the RGB blocking layer, thus abnormal color development on the effective display region may be effectively avoided.

In an embodiment of the invention, the ultraviolet absorbent is one or more of 2-hydroxyl-4-methoxylbenzophenone, 2-hydroxyl-4-n-octoxybenzophenone and 2-(2'-hydroxyl-5'-methylphenyl)benzotriazole.

In another embodiment of the invention, the ultraviolet absorbent comprises 2-hydroxyl-4-methoxylbenzophenone and 2-hydroxyl-4-n-octoxybenzophenone in a mass ratio of from 1:1 to 1:3, preferably in a mass ratio of 1:2.

In further embodiment of the invention, the ultraviolet absorbent comprises 2-hydroxyl-4-n-octoxybenzophenone and 2-(2'-hydroxyl-5'-methylphenyl)benzotriazole in a mass ratio of from 1:1 to 1:3, preferably in a mass ratio of 1:1.

As a first exemplary technical solution of the invention, an ultraviolet absorbent is added to the raw material of the planarization layer. For example, a planarization layer material containing an ultraviolet absorbent is printed on an appropriate region (that is, a region that does not overlap with the seal agent) of a color filter substrate via inkjet printing. Thus, when UV curing is performed on the seal agent, no ultraviolet mask is needed, and the manufacturing process of an ultraviolet mask is omitted. Moreover, a precise amount of material can be deposited on a precise position required via inkjet printing to obtain a precise pattern, thereby unwanted waste of the material may be avoided. Therefore, it is favorable for greatly lowering the cost and simplifying the process, and it may also enlarge the product application field, for example, outdoor display, etc.

In an embodiment of the invention, the addition level of the ultraviolet absorbent in the raw material gel of the planarization layer is in the range from 0.1% to 1.5%, and preferably from 0.8% to 1% based on the mass of the raw material gel of the planarization layer.

In an embodiment of the invention, the raw material gel of the planarization layer may adopt the existing formula, which contains, for example, an epoxy acrylate polymer, a multi-functional monomer and a solvent, etc. The ultraviolet absorbent can be dissolved in the solvent therein. In the invention, the components, processing method and thickness of the raw material gel of the planarization layer may all adopt the existing conventional technologies, except that an amount of an ultraviolet absorbent is added. For example, the thickness may be in the range from 1 μm to 3 μm, and preferably 1.5 μm.

As a second exemplary technical solution of the invention, an ultraviolet absorbent is added to the blocking material of an RGB blocking layer. The object of ultraviolet absorption may also be attained, no ultraviolet mask is needed for the UV curing of the seal agent; and at the same time, the area of the planarization layer in this solution may be kept consistent with that of the color filter substrate (that is, it is not required that the area of the planarization layer be smaller than the area of a region sealed by the seal agent).

A convention color blocking material may be adopted as the above RGB blocking material. In the technical solutions of the invention, no special improvement needs to be made on the RGB blocking material, the amount used or the preparing process, etc.

In an embodiment of the invention, the addition level of the ultraviolet absorbent in the RGB blocking material is in the range of from 0.1% to 1.5%, and preferably in the range from 0.8% to 1% based on the mass of the RGB blocking material.

As a third exemplary technical solution of the invention, an ultraviolet absorbent may be simultaneously added to the raw material gel of the planarization layer and the RGB blocking material of RGB blocking layer to obtain a better effect. For the adding mode and the addition level, etc., of the ultraviolet absorbent in the raw material gel of the planarization layer and the RGB blocking material of RGB blocking layer, reference may be made to the technical solution in which the ultraviolet absorbent is added respectively to the raw material gel of the planarization layer or the RGB blocking material of RGB blocking layer.

By the above three exemplary technical solutions of the invention, after a color filter substrate and a TFT substrate are oppositely arranged to form a cell, UV curing may be directly performed on the seal agent on the side of the color filter substrate (as shown in FIG. 3), without the need of an ultraviolet mask required in a traditional exposing process (as shown in FIG. 1). Therefore, it is favorable for greatly lowering the cost and simplifying the process, and it may also enlarge the product application field, for example, outdoor display, etc.

According to further aspect of the invention, the invention provides a display device, especially an outdoor display device, which contains the above liquid crystal display panel.

According to still further of the invention, the invention provides a method for preparing the above display panel, which specifically includes the steps of:

adding an ultraviolet absorbent to a raw material gel of a planarization layer and/or a blocking material of an RGB blocking material;

forming a planarization layer on a color filter substrate with the raw material gel of the planarization layer, forming an RGB blocking layer with the RGB blocking material, and controlling the area of the planarization layer as no larger than that of a region sealed by a seal agent when the ultraviolet absorbent is added to the raw material gel of the planarization layer;

oppositely arranging the color filter substrate and a TFT substrate to form a cell, and curing the seal agent via ultraviolet from the side of the color filter substrate, thereby obtaining a liquid crystal display panel.

In an embodiment of the invention, when the ultraviolet absorbent is added to the raw material gel of the planarization layer, the addition level of the ultraviolet absorbent in the raw material gel of the planarization layer is in the range of from 0.1% to 1.5%, and preferably 0.8%~1% based on the mass of the raw material gel of the planarization layer, and the area of the planarization layer will be no larger than that of a region sealed by the seal agent, thereby the planarization layer does not overlap with the seal agent.

In an embodiment of the invention, when the ultraviolet absorbent is added to the RGB blocking material, the addition level of the ultraviolet absorbent in the RGB blocking material is in the range of from 0.1% to 1.5%, and preferably in the range from 0.8% to 1% based on the mass of the RGB blocking material.

In an embodiment of the invention, when the ultraviolet absorbent is simultaneously added to the raw material gel of the planarization layer and the blocking material of the RGB blocking layer, for the adding mode and addition level, etc., of the ultraviolet absorbent in the raw material gel of the planarization layer and the RGB blocking material, reference may be made to the technical solution in which the ultraviolet absorbent is respectively added to the raw material gel of the planarization layer or the RGB blocking material.

In an embodiment of the invention, the ultraviolet absorbent is one or more of 2-hydroxyl-4-methoxylbenzophenone, 2-hydroxyl-4-n-octoxybenzophenone and 2-(2'-hydroxyl-5'-methylphenyl)benzotriazole.

In an embodiment of the invention, the ultraviolet absorbent comprises 2-hydroxyl-4-methoxylbenzophenone and 2-hydroxyl-4-n-octoxybenzophenone in a mass ratio of 1:1-1:3, preferably in a mass ratio of 1:2.

In further example of the invention, the ultraviolet absorbent comprises 2-hydroxyl-4-n-octoxybenzophenone and 2-(2'-hydroxyl-5'-methylphenyl)benzotriazole in a mass ratio of from 1:1 to 1:3, preferably in a mass ratio of 1:1.

By the above preparation method of the invention, no ultraviolet mask needs to be used during curing the seal agent. Thus the cost for manufacturing the mask may be saved, the manufacturing of an ultraviolet mask may be omitted, thereby the process may be simplified, and the cost may be effectively lowered.

REFERENCE NUMBER IN THE DRAWING

1: Color Filter Substrate
2: Seal Agent
3: Planarization Layer
3': Planarization Layer
4: TFT Substrate
5: Ultraviolet Mask
6: Ultraviolet Light
Arrow: Ultraviolet Light Irradiation Direction

DETAILED DESCRIPTION OF THE PREFERRED EMBODIMENTS

For the materials used in the embodiments below, raw materials with specific model numbers are all known products that are commercially available, and in the embodiments of the invention, only the manufacturers thereof are introduced briefly. Unless otherwise illustrated, the addition levels concerned in the invention are all represented by a mass percent.

Embodiment 1

Figure 1:
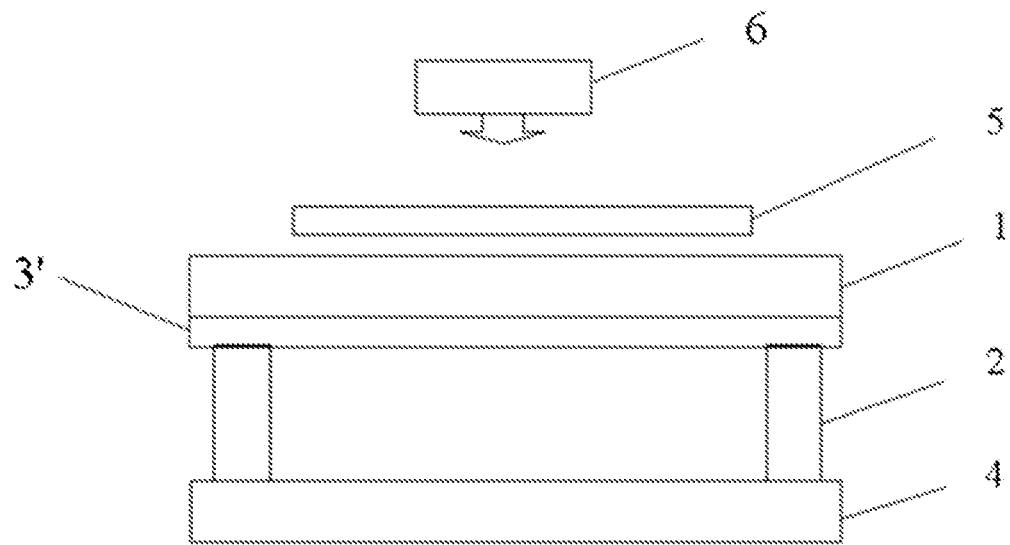
FIG. 1 is a schematic diagram showing a UV curing state of a liquid crystal display panel in the prior art.
Figure 2:
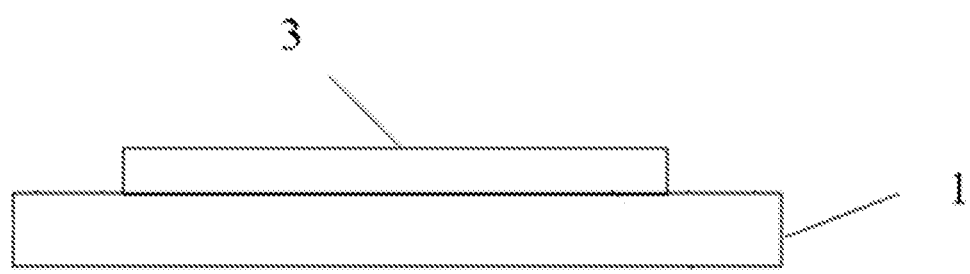
FIG. 2 is a structural representation of a color filter substrate and a planarization layer of the invention.
Figure 4:
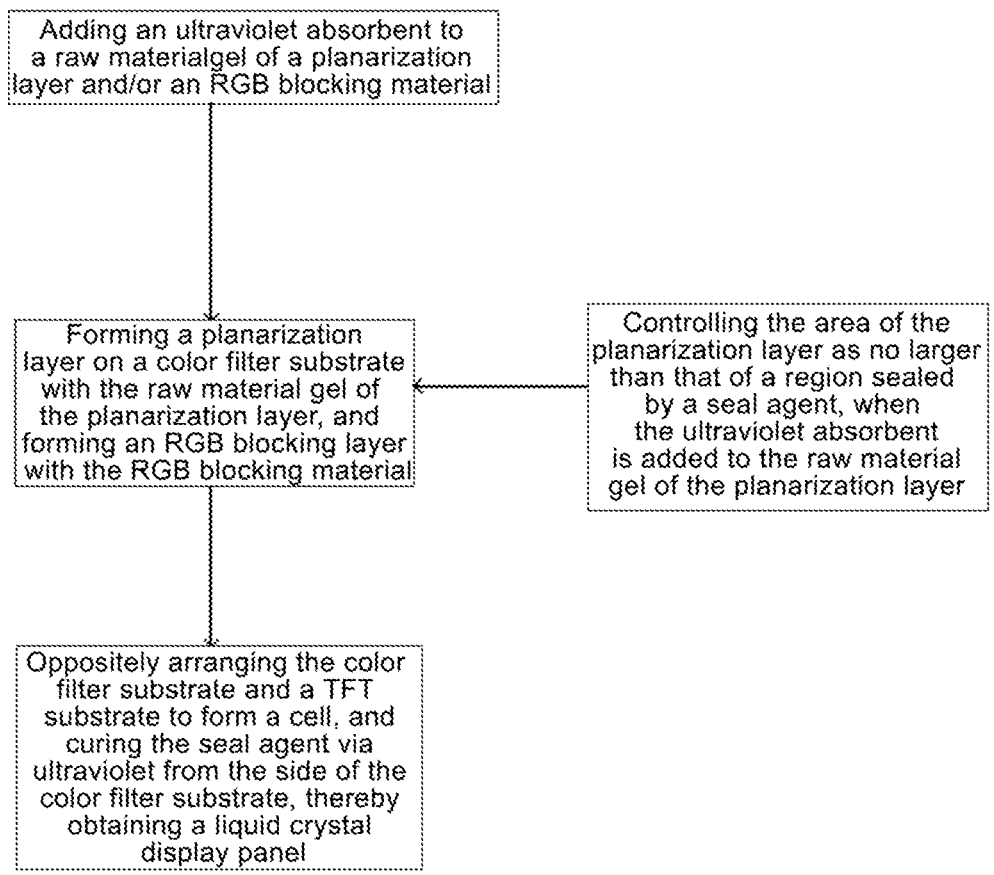
FIG. 4 is a flow chart of a method for preparing a liquid crystal display panel according to an embodiment of the invention.

Following the method for preparing a liquid crystal display panel as shown in FIG. 4, the liquid crystal display panel according to the embodiment 1 includes the steps of:

adding an ultraviolet absorbent to a raw material gel of a planarization layer, wherein, the addition level of the ultraviolet absorbent in the raw material gel of the planarization layer is 0.8% by mass, and the ultraviolet absorbent comprises 2-hydroxyl-4-methoxylbenzophenone and 2-hydroxyl-4-n-octoxybenzophenone in a mass ratio of 1:2;

forming a planarization layer (see FIG. 2) on a color filter substrate with the raw material gel of the planarization layer, and forming an RGB blocking layer with an RGB blocking material, wherein the area of the planarization layer will be no larger than that of a region sealed by the seal agent; and oppositely arranging the color filter substrate and a TFT substrate to form a cell, and UV curing the seal agent on the side of the color filter substrate, thereby obtaining a liquid crystal display panel.

Figure 3:
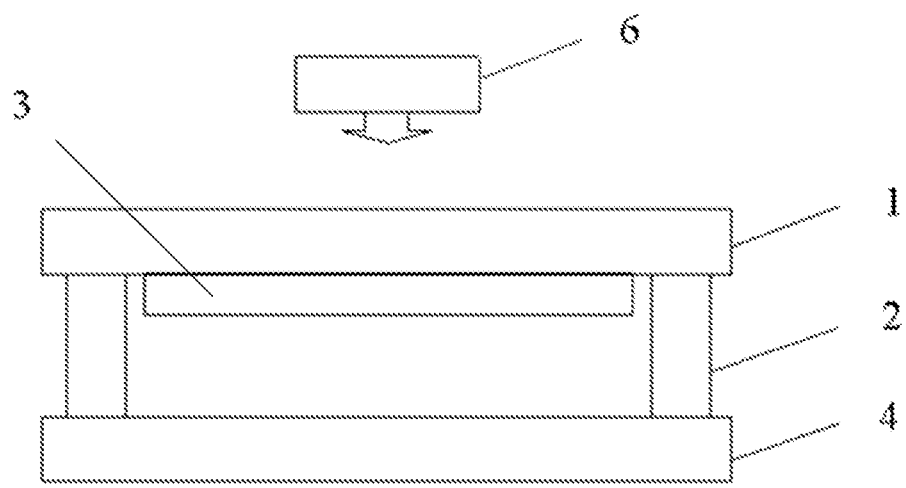
FIG. 3 is a schematic diagram showing a UV curing state of a liquid crystal display panel according to an embodiment of the invention.

As shown in FIG. 3, the liquid crystal display panel of the embodiment 1 includes a color filter substrate 1, and a black matrix, an RGB blocking layer (not shown) and a planarization layer 3 that are formed in turn on the color filter substrate 1, and a TFT substrate 4. After the color filter substrate 1 and the TFT substrate 4 are oppositely arranged to form a cell, a seal agent 2 is cured via an ultraviolet light 6 (the arrow shows the ultraviolet light irradiation direction), wherein the ultraviolet absorbents are added to the raw material gel of the planarization layer 3.

In practical application, the liquid crystal display panel prepared in the embodiment 1 demonstrates a desirable color development performance. This proves that, after an appropriate amount of ultraviolet absorbent, i.e., (2-hydroxyl-4-methoxylbenzophenone and 2-hydroxyl-4-n-octoxybenzophenone) is added to the raw material gel of the planarization layer, when UV curing is performed on the seal agent via an ultraviolet light, the ultraviolet light irradiated on the display region may be absorbed by the ultraviolet absorbent in the raw material gel of the planarization layer, and abnormal color development on the effective display region may be effectively avoided, which is an equivalent substitution for the application of an ultraviolet mask.

Embodiment 2

Following the method for preparing a liquid crystal display panel as shown in FIG. 4, the liquid crystal display panel according to the embodiment 2 includes the steps of:

adding an ultraviolet absorbent to a raw material gel of a planarization layer, wherein, the addition level of the ultraviolet absorbent in the raw material gel of the planarization layer is 1.5% by mass, and the ultraviolet absorbent comprises 2-hydroxyl-4-methoxylbenzophenone and 2-(2'-hydroxyl-5'-methylphenyl)benzotriazole in a mass ratio of 1:2;

forming a planarization layer (see FIG. 2) on a color filter substrate with the raw material gel of the planarization layer, and forming an RGB blocking layer with an RGB blocking material, wherein the area of the planarization layer will be no larger than that of a region sealed by the seal agent; and oppositely arranging the color filter substrate and a TFT substrate to form a cell, and UV curing the seal agent on the side of the color filter substrate, thereby obtaining a liquid crystal display panel.

As shown in FIG. 3, the liquid crystal display panel of the embodiment 2 includes a color filter substrate 1, and a black matrix, an RGB blocking layer (not shown) and a planarization layer 3 that are formed in turn on the color filter substrate 1, and a TFT substrate 4. After the color filter substrate 1 and the TFT substrate 4 are oppositely arranged to form a cell, a seal agent 2 is cured via an ultraviolet light 6, wherein an ultraviolet absorbent is added to the raw material gel of the planarization layer 3.

In practical application, the liquid crystal display panel prepared in the embodiment 1 demonstrates a desirable color development performance. This proves that, after an appropriate amount of ultraviolet absorbent, i.e., 2-hydroxyl-4-methoxylbenzophenone and 2-(2'-hydroxyl-5'-methylphenyl)benzotriazole is added to the raw material gel of the planarization layer, when UV curing is performed on the seal agent via an ultraviolet light, the ultraviolet light irradiated on the display region may be absorbed by the ultraviolet absorbent in the raw material gel of the planarization layer, and abnormal color development on the effective display region may be effectively avoided, which is an equivalent substitution for the application of an ultraviolet mask.

Embodiment 3

In comparison with Embodiment 1, the difference only lies in that in the embodiment 3, an ultraviolet absorbent is added to an RGB blocking material, and the raw material and the structure of the planarization layer are the same as those of the prior art.

As shown in FIG. 4, a method for preparing a liquid crystal display panel according to the embodiment 3 includes the steps of:

adding an ultraviolet absorbent to an RGB blocking material, wherein the addition level of the ultraviolet absorbent in the RGB blocking material is 0.5% by mass, and the ultraviolet absorbent is 2-hydroxyl-4-methoxylbenzophenone;

forming a planarization layer (see FIG. 2) on a color filter substrate with the raw material gel of the planarization layer, and forming an RGB blocking layer with an RGB blocking material; and oppositely arranging the color filter substrate and a TFT substrate to form a cell, and UV curing the seal agent on the side of the color filter substrate, thereby obtaining a liquid crystal display panel.

As shown in FIG. 3, the liquid crystal display panel of the embodiment 3 includes a color filter substrate 1, and a black matrix, an RGB blocking layer (not shown) and a planarization layer 3 that are formed in turn on the color filter substrate 1, and a TFT substrate 4. After the color filter substrate 1 and the TFT substrate 4 are oppositely arranged to form a cell, a seal agent 2 is cured via an ultraviolet light 6, wherein an ultraviolet absorbent is added to the RGB blocking layer of the an RGB blocking layer.

In practical application, the liquid crystal display panel prepared in the embodiment demonstrates a desirable color development performance. This proves that, after an appropriate amount of ultraviolet absorbent, i.e., 2-hydroxyl-4-methoxylbenzophenone is added to the RGB blocking material, when UV curing is performed on the seal agent via an ultraviolet light, the ultraviolet light irradiated on the display region may be absorbed by the ultraviolet absorbent in the RGB blocking material, and abnormal color development on the effective display region may be effectively avoided, which is an equivalent substitution for the application of an ultraviolet mask.

Embodiment 4

In comparison with Embodiment 1, the difference only lies in that in the embodiment 4, an ultraviolet absorbent is further added to an RGB blocking material simultaneously.

As shown in FIG. 4, a method for preparing a liquid crystal display panel according to the embodiment 4 includes the steps of:

adding an ultraviolet absorbent to a raw material gel of a planarization layer and an RGB blocking material, wherein, the addition level of the ultraviolet absorbent in the raw material gel of the planarization layer is 0.8% by mass and the ultraviolet absorbent comprises 2-hydroxyl-4-methoxylbenzophenone and 2-hydroxyl-4-n-octoxybenzophenone in a mass ration of 1:2, and the addition level of the ultraviolet absorbent in the RGB blocking material is 1% by mass and the ultraviolet absorbent is consisted by mixing 2-hydroxyl-4-methoxylbenzophenone and 2-hydroxyl-4-n-octoxybenzophenone in a proportion of 1:2;

forming a planarization layer (see FIG. 2) on a color filter substrate with the raw material gel of the planarization layer, and forming an RGB blocking layer with the RGB blocking material, wherein the area of the planarization layer will be no larger than the area of a region sealed by the seal agent; and oppositely arranging the color filter substrate and a TFT substrate to form a cell, and UV curing the seal agent on the side of the color filter substrate, thereby obtaining a liquid crystal display panel.

As shown in FIG. 3, the liquid crystal display panel of the embodiment 4 includes a color filter substrate 1, and a black matrix, an RGB blocking layer (not shown) and a planarization layer 3 that are formed in turn on the color filter substrate 1, and a TFT substrate 4. After the color filter substrate 1 and the TFT substrate 4 are oppositely arranged to form a cell, a seal agent 2 is cured via an ultraviolet light 6, wherein an ultraviolet absorbent is added to the RGB blocking layer of the an RGB blocking layer.

In practical application, the liquid crystal display panel prepared in the embodiment demonstrates a desirable color development performance. This proves that, after an appropriate amount of ultraviolet absorbent, i.e., 2-hydroxyl-4-methoxylbenzophenone and 2-hydroxyl-4-n-octoxybenzophenone is added to the raw material gel of the planarization layer and the RGB blocking material simultaneously, when UV curing is performed on the seal agent via an ultraviolet light, the ultraviolet light irradiated on the display region may be jointly absorbed by the ultraviolet absorbent in the raw material gel of the planarization layer and the RGB blocking material, and abnormal color development on the effective display region may be effectively avoided, which is an equivalent substitution for the application of an ultraviolet mask.

Embodiment 5

A display device, especially an outdoor display device, which contains the liquid crystal display panel according to any one of Embodiments 1-4.

The implementation solutions in the above embodiments may be further combined or substituted, and the above embodiments only show some preferred embodiments of the invention, rather than limiting the concept and scope of the invention. Various variations and improvements made on the technical solutions of the invention by one skilled in the art without departing from the design philosophy of the invention will fall within the protection scope of the invention.

What is claimed is:

1. A liquid crystal display panel, comprising:
   a color filter substrate;
   a RGB blocking layer on the color filter substrate;
   a planarization layer having a raw material gel on the color filter substrate;
   a TFT substrate opposite to the color filter substrate; and
   a UV-cured seal agent between the color filter substrate and the TFT substrate;
   wherein:
   the planarization layer comprises an UV absorbent in the raw material gel;
   an area of the planarization layer is no larger than a region sealed by the UV-cured seal agent; and
   the planarization layer covers the whole surface of the color filter substrate in a region sealed by the UV-cured seal agent.

2. The liquid crystal display panel according to claim 1, wherein the ultraviolet absorbent consists of 2-hydroxyl-4-methoxylbenzophenone and 2-hydroxyl-4-n-octoxybenzophenone which are mixed in a mass ratio of 1:2.

3. The liquid crystal display panel according to claim 1, wherein the ultraviolet absorbent consists of 2-hydroxyl-4-n-octoxybenzophenone and 2-(2'-hydroxyl-5'-methylphenyl) benzotriazole which are mixed in a mass ratio of 1:1.

4. The liquid crystal display panel according to claim 1, wherein the addition level of the ultraviolet absorbent in the raw material gel of the planarization layer is in the range from 0.1% to 1.5% by mass.

5. The liquid crystal display panel according to claim 1, wherein the addition level of the ultraviolet absorbent in the raw material gel of the planarization layer is in the range from 0.8% to 1.0% by mass.

6. The liquid crystal display panel according to claim 1, wherein the planarization layer is formed by printing the raw material gel of the planarization layer on the color filter substrate through an ink-jet method.

7. The liquid crystal display panel according to claim 4, wherein the planarization layer is formed by printing the raw material gel of the planarization layer on the color filter substrate through an ink-jet method.

8. The liquid crystal display panel according to claim 5, wherein the planarization layer is formed by printing the raw material gel of the planarization layer on the color filter substrate through an ink-jet method.

9. The liquid crystal display panel according to claim 1, wherein the RGB blocking layer comprises an ultraviolet absorbent and an addition level of the ultraviolet absorbent in the RGB blocking layer is in the range from 0.1% to 1.5% by mass.

10. A display device comprising the liquid crystal display panel according to claim 1.

11. A method for preparing a liquid crystal display panel, comprising the steps of:
    adding an ultraviolet absorbent to a raw material gel of a planarization layer;
    forming a planarization layer on a color filter substrate with the raw material gel of the planarization layer, forming an RGB blocking layer with the RGB blocking material, and controlling the area of the planarization layer as no larger than that of a region sealed by a UV-cured seal agent, wherein the planarization layer comprises an UV absorbent in the raw material gel; and oppositely arranging the color filter substrate and a TFT substrate to form a cell, and curing the UV-cured seal agent via ultraviolet from the side of the color filter substrate, thereby obtaining a liquid crystal display panel, wherein the planarization layer covers the whole surface of the color filter substrate in a region sealed by the UV-cured seal agent.

12. The method according to claim 11, wherein the ultraviolet absorbent in the raw material gel of the planarization layer is in the range from 0.1% to 1.5% by mass.

13. The method according to claim 11, wherein the ultraviolet absorbent consists of 2-hydroxyl-4-methoxylbenzophenone and 2-hydroxyl-4-n-octoxybenzophenone which are mixed in a mass ratio of 1:2.

14. The method according to claim 11, wherein when the ultraviolet absorbent is added to the raw material gel of the planarization layer, the addition level of the ultraviolet absorbent in the raw material gel of the planarization layer is in the range from 0.1% to less than 0.5% by mass.

15. The liquid crystal display panel according to claim 1, wherein the addition level of the ultraviolet absorbent in the raw material gel of the planarization layer is in the range from 0.1% to less than 0.5% by mass.

16. The liquid crystal display panel according to claim 1, wherein the ultraviolet absorbent consists of 2-hydroxyl-4-methoxylbenzophenone and 2-hydroxyl-4-n-octoxybenzophenone which are mixed in a mass ratio of 1:1 to 1:3, or 2-hydroxyl-4-n-octoxybenzophenone and 2-(2'-hydroxyl-5'-methylphenyl) benzotriazole which are mixed in a mass ratio of 1:1 to 1:3.

17. The method according to claim 11, wherein the ultraviolet absorbent consists of 2-hydroxyl-4-methoxylbenzophenone and 2-hydroxyl-4-n-octoxybenzophenone which are mixed in a mass ratio of 1:1 to 1:3, or 2-hydroxyl-4-n-octoxybenzophenone and 2-(2'-hydroxyl-5'-methylphenyl) benzotriazole which are mixed in a mass ratio of 1:1 to 1:3.

* * * * *